(12) United States Patent
Kuzushima (10) Patent No.: US 10,363,969 B2
(45) Date of Patent: Jul. 30, 2019

(54) VEHICLE UNDERSTRUCTURE

(71) Applicant: TOYOTA JIDOSHA KABUSHIKI KAISHA, Toyota-shi (JP)

(72) Inventor: Shinya Kuzushima, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 51 days.

(21) Appl. No.: 15/838,576

(22) Filed: Dec. 12, 2017

(65) Prior Publication Data

US 2018/0170442 A1 Jun. 21, 2018

(30) Foreign Application Priority Data

Dec. 16, 2016 (JP) ................. 2016-244464

(51) Int. Cl.
*B62D 25/02* (2006.01)
*B62D 27/02* (2006.01)
*B60R 13/04* (2006.01)

(52) U.S. Cl.
CPC ............ *B62D 25/025* (2013.01); *B60R 13/04* (2013.01); *B62D 27/02* (2013.01); *B60R 2013/046* (2013.01)

(58) Field of Classification Search
CPC ...... B62D 27/02; B62D 25/025; B60R 13/04; B60R 2013/046
See application file for complete search history.

(56) References Cited

FOREIGN PATENT DOCUMENTS

JP 2013-159192 8/2013

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

A rocker molding includes a side wall part, and an extending part. A rear liner is attached to the extending part. An outer surface of the extending part is provided with a first protruding strip part that protrudes toward a side far from a forward-rearward center position of the vehicle and a second protruding strip part that protrudes toward the side far from the forward-rearward center position of the vehicle and is located between an edge of the rear liner on a side far from the vehicle width center position and the first protruding strip part. The edge of the rear liner on the side far from the vehicle width center position in the vehicle width direction and the edge of the second protruding strip part of the extending part on the side near the vehicle width center position in the vehicle width direction extend in parallel.

4 Claims, 4 Drawing Sheets

VEHICLE UNDERSTRUCTURE

INCORPORATION BY REFERENCE

The disclosure of Japanese Patent Application No. 2016-244464 filed on Dec. 16, 2016 including the specification, drawings and abstract is incorporated herein by reference in its entirety.

BACKGROUND

1. Technical Field

The present disclosure relates to a vehicle understructure.

2. Description of Related Art

Figure 4:
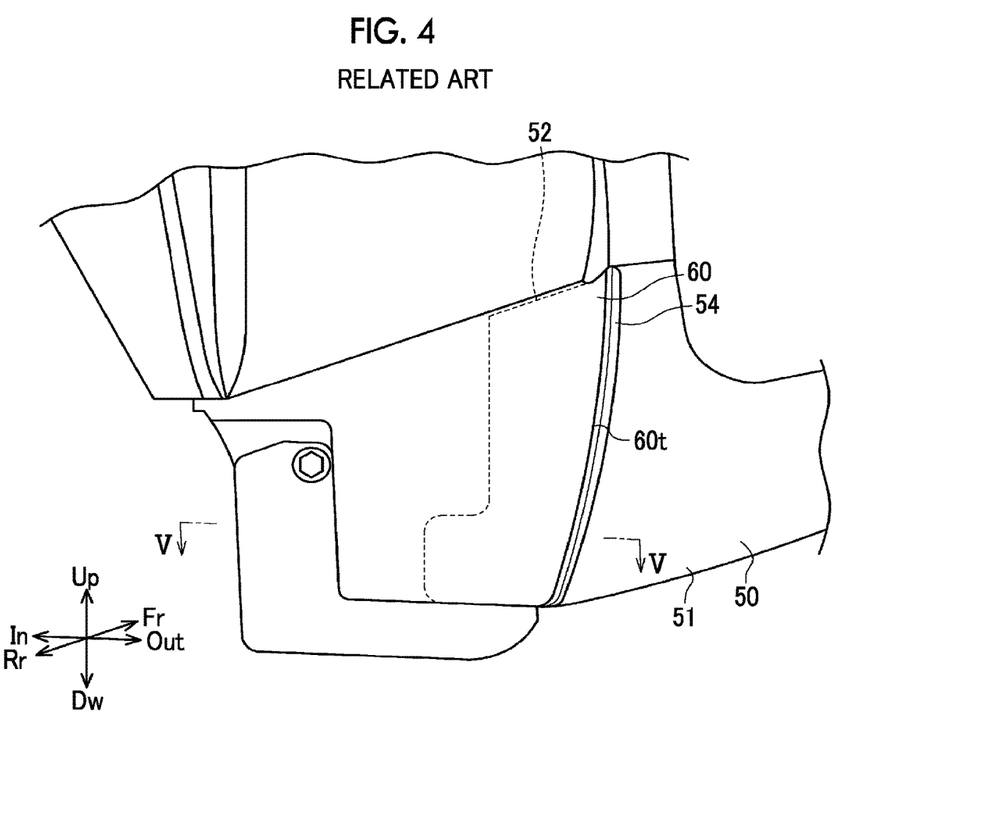
FIG. 4 is a perspective view illustrating the vehicle understructure of the related art.
Figure 5:
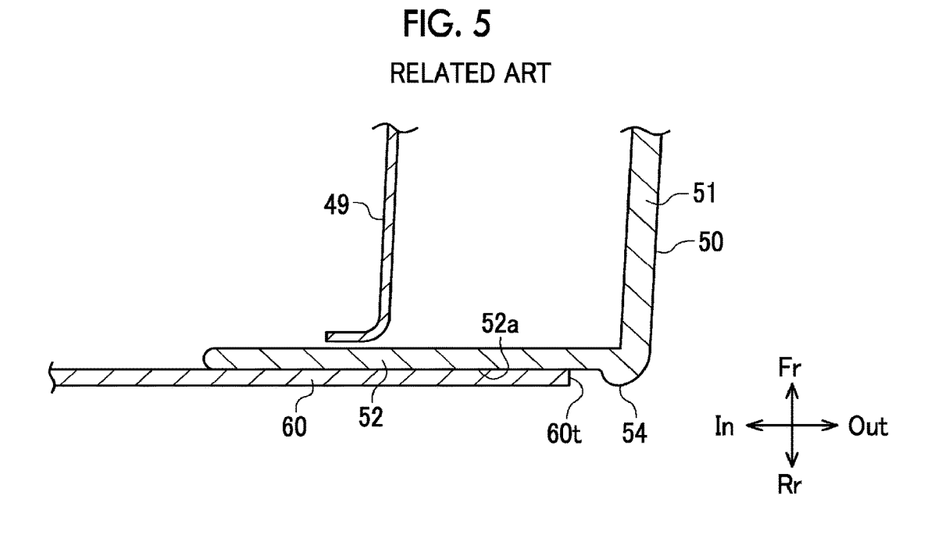
FIG. 5 is a sectional view taken along line V-V of FIG. 4.

As illustrated in FIGS. 4 and 5, the vehicle understructure described in Japanese Unexamined Patent Application Publication No. 2013-159192 (JP 2013-159192 A) includes a rocker molding 50 attached to a lower part of a door opening part of a vehicle. The rocker molding 50 includes a side wall part 51 that extends in a forward-rearward direction (arrow directions indicated by "Fr" and "Rr" of FIGS. 4 and 5) of the vehicle in a range from a wheel housing on a front side of the vehicle to a wheel housing 49 on a rear side of the vehicle, a plate-shaped extending part 52 that extends toward a vehicle width center position (arrow direction side illustrated by "In" of FIGS. 4 and 5) in a vehicle width direction from a rear end of the side wall part 51. Also, as illustrated in FIG. 5, a rear liner 60 extending along the extending part 52 is fixed to an outer surface 52a (rear surface) of the extending part 52 of the rocker molding 50 in the forward-rearward direction of the vehicle. A portion of the outer surface 52a of the extending part 52 on a vehicle width center side in the vehicle width direction is covered with the rear liner 60.

The outer surface 52a of the extending part 52 is provided with a protruding strip part 54 that protrudes toward the rear side of the vehicle and extends along an edge of the outer surface 52a of the extending part 52 on a side (an arrow direction side indicated by "Out" of FIGS. 4 and 5) far from the vehicle width center position in the vehicle width direction. Additionally, in the vehicle understructure of a statement in JP 2013-159192 A, the protruding strip part 54 in the extending part 52 extends parallel to an edge 60t of the rear liner 60 on the side far from the vehicle width center position in the vehicle width direction.

SUMMARY

Meanwhile, in order to increase the variation of the external appearance of the vehicle even in the same type of vehicle, the rocker molding 50 with a different shape may be attached. Depending on the shape of the rocker molding 50, the protruding strip part 54 extending along the edge of the outer surface 52a of the extending part 52 on the side far from the vehicle width center position in the vehicle width direction may not become parallel to the edge 60t of the rear liner 60 on the side far from the vehicle width center position in the vehicle width direction. In a case where the protruding strip part 54 does not extend parallel to the edge 60t of the rear liner 60 on the side far from the vehicle width center position in the vehicle width direction, the spacing between the edge 60t on the side far from the vehicle width center position in the vehicle width direction and the protruding strip part 54 varies up and down. Therefore, in a case where the rear liner 60 is visually recognized, there is a possibility that a user may be caused to feel discomfort such as whether or not the rocker molding 50 is assembled at a correct position with respect to the rear liner 60.

An aspect of the present disclosure relates to a vehicle understructure including a rocker molding that is disposed at a lower part of a vehicle and extends in a forward-rearward direction of the vehicle, and a liner that is attached to at least one end part of the rocker molding in the forward-rearward direction of the vehicle. The rocker molding includes a side wall part and an extending part which is plate-shaped. The side wall part extends in the forward-rearward direction of the vehicle in a range from a wheel housing on a front side of the vehicle to a wheel housing on a rear side of the vehicle. The extending part extends toward a vehicle width center position in a vehicle width direction of the vehicle from one end part of the side wall part in the forward-rearward direction of the vehicle, which is the one end part of the rocker molding. The liner is attached to the extending part so as to cover a portion of an outer surface of the extending part on a vehicle width center side in the vehicle width direction. The outer surface is a surface far from a forward-rearward center position of the vehicle out of two surfaces of the extending part in the forward-rearward direction of the vehicle. The outer surface of the extending part includes a first protruding strip part and a second protruding strip part that protrude toward a side far from the forward-rearward center position of the vehicle. The first protruding strip part extends along an edge of the extending part on the side far from the vehicle width center position in the vehicle width direction. The second protruding strip part is located between on an edge of the liner on the side far from the vehicle width center position in the vehicle width direction and the first protruding strip part. The edge of the liner on the side far from the vehicle width center position in the vehicle width direction and an edge of the second protruding strip part of the extending part on a side near the vehicle width center position in the vehicle width direction extends in parallel.

According to the aspect of the present disclosure, the second protruding strip part is provided in addition to the first protruding strip part that extends along the edge of the extending part on the side far from the vehicle width center position in the vehicle width direction. Also, the second protruding strip part is located closer to the edge of the liner on the side far from the vehicle width center position in the vehicle width direction than the first protruding strip part, and the edge of the second protruding strip part on the side near the vehicle width center position in the vehicle width direction extends parallel to the edge of the liner on the side far from the vehicle width center position in the vehicle width direction. Hence, even when the first protruding strip part that extends along the edge of the extending part on the side far from the vehicle width center position in the vehicle width direction is not parallel to the edge of the liner on the side far from the vehicle width center position in the vehicle width direction, the spacing between the edge, on the side near the vehicle width center position in the vehicle width direction, of the second protruding strip part located closer to the liner, and the edge of the liner on the side far from the vehicle width center position in the vehicle width direction becomes uniform in the upward-downward direction, and a situation in which a user feels discomfort can be suppressed.

In the vehicle understructure according to the aspect of the present disclosure, a portion of the second protruding strip part on a side farther from the vehicle width center position in the vehicle width direction than a protruding tip of the second protruding strip part may be inclined such that the protruding height of the second protruding strip part becomes gradually lower toward the side far from the vehicle width center position.

According to the aspect of the present disclosure, the second protruding strip part becomes lower toward the side far from the vehicle width center position at the inclined part on the side farther from the vehicle width center position in the vehicle width direction than the protruding tip. For that reason, a line extending in the vehicle upward-downward direction is not visually recognized on the side of the second protruding strip part farther from the vehicle width center position in the vehicle width direction than the protruding tip. Hence, when the second protruding strip part is visually recognized, the edge, on the side near the vehicle width center position in the vehicle width direction, of the second protruding strip part extending parallel to the edge of the liner on the side far from the vehicle width center position in the vehicle width direction has relatively high visibility.

In the vehicle understructure according to the aspect of the present disclosure, the protruding tip of the second protruding strip part may extend parallel to the edge of the liner on the side far from the vehicle width center position in the vehicle width direction. According to the aspect of the present disclosure, the protruding tip having relatively high visibility is also parallel to the edge of the liner on the side far from the vehicle width center position in the vehicle width direction in addition to the edge of the second protruding strip part on the side near the vehicle width center position in the vehicle width direction. Thus, a sense of unity can be created.

In the vehicle understructure according to the aspect of the present disclosure, a length in the vehicle width direction from the protruding tip of the second protruding strip part to the edge of the second protruding strip part on the side near the vehicle width center position in the vehicle width direction may be shorter than a length from the protruding tip of the second protruding strip part to the edge of the second protruding strip part on the side far from the vehicle width center position in the vehicle width direction.

In addition, as the protruding tip of the second protruding strip part and the edge of the second protruding strip part on the side near the vehicle width center position in the vehicle width direction, which extend parallel to the edge of the liner on the side far from the vehicle width center position in the vehicle width direction, are closer to each other, the edge of the second protruding strip part on the side near the vehicle width center position in the vehicle width direction and the protruding tip of the second protruding strip part are made to visually recognize as an integral line, and a sense of unity can be created.

According to the aspect of the present disclosure, the length from the protruding tip of the second protruding strip part to the edge of the second protruding strip part on the side near the vehicle width center position in the vehicle width direction is shorter than the length from the protruding tip of the second protruding strip part to the edge of the second protruding strip part on the side far from the vehicle width center position in the vehicle width direction. For that reason, compared to a case where the above lengths are equal to each other or a case where the length from the protruding tip of the second protruding strip part to the edge of the second protruding strip part on the side near the vehicle width center position in the vehicle width direction is made larger than the length from the protruding tip of the second protruding strip part to the edge of the second protruding strip part on the side far from the vehicle width center position in the vehicle width direction, the protruding tip of the second protruding strip part and the edge of the second protruding strip part on the side near the vehicle width center position in the vehicle width direction can be brought closer to each other, and a sense of unity can be created.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
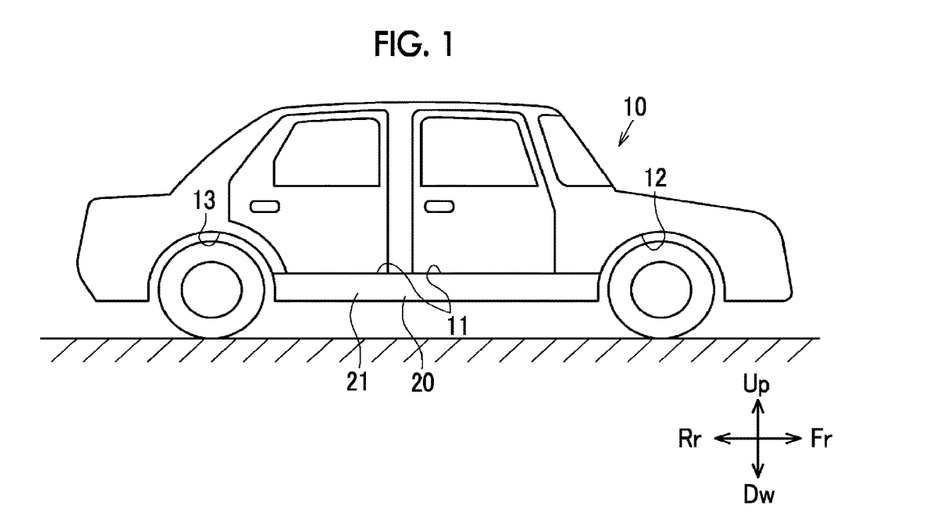
FIG. 1 is a side view of a vehicle to which one embodiment of a vehicle understructure is applied.
Figure 2:
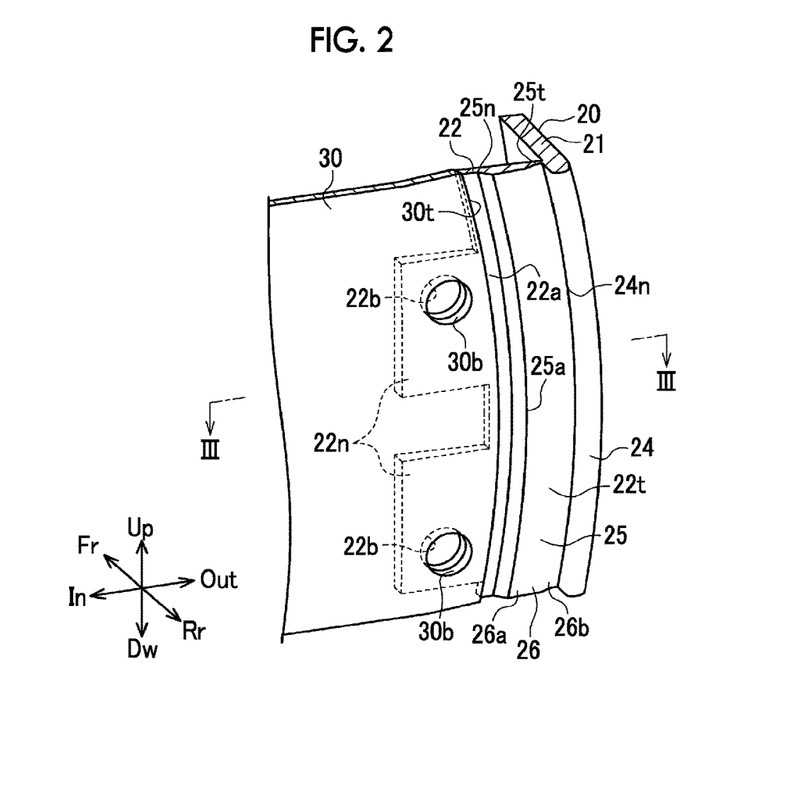
FIG. 2 is a perspective view illustrating a fixing portion between a rocker molding and a rear liner.
Figure 3:
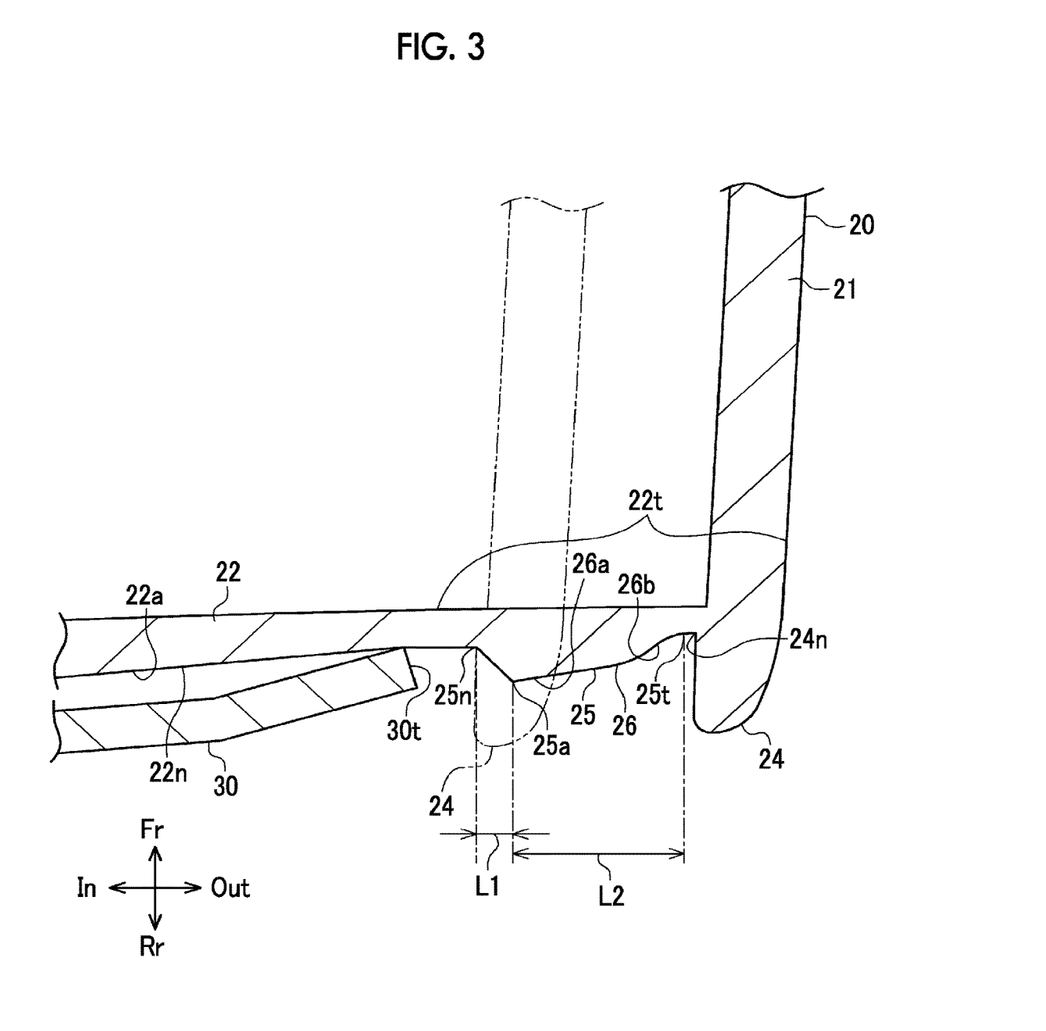
FIG. 3 is a sectional view taken along line III-III of FIG. 2.

Hereinafter, one embodiment of a vehicle understructure will be described with reference to FIGS. 1 to 3. In addition, in FIGS. 1 to 3, arrow Fr indicates a vehicle front and arrow Rr indicates a vehicle rear. In FIGS. 1 and 2, arrow Up indicates a vehicle upside and arrow Dw illustrates a vehicle downside. In FIGS. 2 and 3, arrow In indicates a vehicle inward direction in a vehicle width direction and arrow Out indicates a vehicle outward direction in a vehicle width direction.

As illustrated in FIG. 1, a rocker molding 20 is attached to a lower part of a door opening 11 of a vehicle 10 so as to extend in a forward-rearward direction of the vehicle. The rocker molding 20 is made of resin, or a composite material of carbon fiber and resin.

As illustrated in FIGS. 1 and 2, the rocker molding 20 includes a plate-shaped side wall part 21 that extends in the forward-rearward direction of the vehicle in a range from a wheel housing 12 on a front side of the vehicle to a wheel housing 13 on a rear side of the vehicle. In addition, a surface of the side wall part 21 on a side far from a vehicle width center position in the vehicle width direction constitutes an outer surface of the vehicle, and is a design surface that influences the external appearance of the vehicle 10.

As illustrated in FIG. 2, a plate-shaped extending part 22 extends toward the vehicle width center position in the vehicle width direction from a rear end of the side wall part 21. The extending part 22 includes a portion 22t on the side far from the vehicle width center position in the vehicle width direction, and a fixing piece 22n that protrudes from an edge, on a side near the vehicle width center position in the vehicle width direction, of the portion 22t on the side far from the vehicle width center position in the vehicle width direction to the side near the vehicle width center position in the vehicle width direction. The fixing piece 22n is provided with a bolt hole 22b that passes therethrough in its thickness direction (the forward-rearward direction of the vehicle). Two fixing pieces 22n are provided side by side in a vehicle upward-downward direction.

A liner (a rear liner in the present embodiment) 30 extends along the extending part 22 on an outer surface 22a (rear surface) of the extending part 22 of the rocker molding 20 in the forward-rearward direction of the vehicle. Portions of the outer surface 22a of the extending part 22 on the vehicle width center side in the vehicle width direction, specifically, the fixing pieces 22n are covered with the rear liner 30.

The rear liner 30 includes two bolt holes 30b that are aligned in the vehicle upward-downward direction. By inserting bolts through the bolt holes 30b of the rear liner 30 and the bolt holes 22b of the extending part 22 in a state after the rear liner 30 overlaps the extending part 22 from the vehicle rear, the rear liner 30 is fixed to the extending part 22. In addition, in FIG. 2, the illustration of the bolts inserted through the bolt holes 30b is omitted.

The rear liner 30 is slightly bent in a chevron shape to the extending part 22 side midway in the vehicle width direction, and an edge 30t of the rear liner 30 on the side far from the vehicle width center position in the vehicle width direction is in a state where the edge is elastically pressed against the extending part 22. Accordingly, floating of the rear liner 30 from the extending part 22 is suppressed.

As illustrated in FIGS. 2 and 3, the thickness of the extending part 22 becomes gradually smaller toward the side far from the vehicle width center position in the vehicle width direction from the side near the vehicle width center position in the vehicle width direction. Additionally, the outer surface 22a of the portion 22t of the extending part 22 on the side far from the vehicle width center position in the vehicle width direction is provided with a first protruding strip part 24 that protrudes toward the rear side of the vehicle and extends along the edge of the outer surface 22a of the extending part 22 on the side far from the vehicle width center position in the vehicle width direction. A protruding tip (a tip on the rear side of the vehicle) of the first protruding strip part 24 has a chamfered shape without a corner. Also, a portion, closer to the vehicle width center side in the vehicle width direction than the first protruding strip part 24, in the outer surface 22a of the portion 22t of the extending part 22 on the side far from the vehicle width center position in the vehicle width direction is provided with a second protruding strip part 25 that protrudes toward the rear side of the vehicle. The second protruding strip part 25 is located between the edge 30t of the rear liner 30 on the side far from the vehicle width center position in the vehicle width direction and the first protruding strip part 24 in the vehicle width direction. The protruding height of the second protruding strip part 25 is lower than the protruding height of the first protruding strip part 24.

A length L1 in the vehicle width direction from the protruding tip 25a of the second protruding strip part 25 to an edge 25n of the second protruding strip part 25 on the side near the vehicle width center position in the vehicle width direction is shorter than a length L2 from the protruding tip 25a of the second protruding strip part 25 to an edge 25t of the second protruding strip part 25 on the side far from the vehicle width center position in the vehicle width direction. In addition, the protruding tip 25a of the second protruding strip part 25 does not have a chamfered shape, and has a shape with an edge.

A portion of the second protruding strip part 25 on the side farther from the vehicle width center position in the vehicle width direction than the protruding tip 25a of the second protruding strip part 25 is an inclined part 26 that is inclined such that the protruding height thereof becomes gradually lower toward the side far from the vehicle width center position. The inclination angle of the inclined part 26 of the present embodiment changes midway in the vehicle width direction, and the inclination angle of a portion 26b of the inclined part 26 on the side far from the vehicle width center position in the vehicle width direction is made larger than the inclination angle of a portion 26a of the inclined part 26 on the vehicle width center side in the vehicle width direction. Also, in the inclined part 26, the portion 26a on the vehicle width center side in the vehicle width direction and the portion 26b on the side far from the vehicle width center position in the vehicle width direction are smoothly connected together by a curved surface. The portion 26b of the inclined part 26 on the side far from the vehicle width center position in the vehicle width direction has the same height as the outer surface 22a of a portion of the extending part 22 where the first protruding strip part 24 and the second protruding strip part 25 are not formed, at an edge 25t of the second protruding strip part 25 on the side far from the vehicle width center position in the vehicle width direction, and is connected to the outer surface 22a.

In the present embodiment, the second protruding strip part 25 in the extending part 22 extends parallel to the edge 30t of the rear liner 30 on the side far from the vehicle width center position in the vehicle width direction. Also, the edge 30t of the rear liner 30 on the side far from the vehicle width center position in the vehicle width direction and the edge 25n of the second protruding strip part 25 of the extending part 22 on the side near the vehicle width center position in the vehicle width direction extend in parallel. Moreover, the protruding tip 25a of the second protruding strip part 25 extends parallel to the edge 30t of the rear liner 30 on the side far from the vehicle width center position in the vehicle width direction. Additionally, the spacing in the vehicle width direction between the edge 25n of the second protruding strip part 25 on the side near the vehicle width center position in the vehicle width direction and the edge 30t of the rear liner 30 on the side far from the vehicle width center position in the vehicle width direction has a predetermined size. In addition, the predetermined size is set to such a size that visibility to a user becomes relatively high by providing the edge 25n of the second protruding strip part 25 on the side near the vehicle width center position in the vehicle width direction and the edge 30t of the rear liner 30 on the side far from the vehicle width center position in the vehicle width direction as an integral line, and is set to, for example, a size within a range of 1 cm to 3 cm.

Next, the working of the vehicle understructure will be described together with effects. In the rocker molding 20, for example, when the vehicle 10 is viewed from an oblique rear side, the edge 30t of the rear liner 30 on the side far from the vehicle width center position in the vehicle width direction has relatively low visibility due to the first protruding strip part 24.

Meanwhile, in order to increase the variation of the external appearance of the vehicle 10 even in the same type of vehicle, a rocker molding 20 with a different shape may be attached. Depending on the shape of a rocker molding 20 to adopt, as indicated by a two-dot chain line in FIG. 3, the spacing in the vehicle width direction between an edge 24n, on the side near the vehicle width center position in the vehicle width direction, of the first protruding strip part 24 extending along the edge of the outer surface 22a of the extending part 22 on the side far from the vehicle width center position in the vehicle width direction and the edge 30t of the rear liner 30 on the side far from the vehicle width center position in the vehicle width direction has a predetermined size. In such a case, the edge 24n of the first protruding strip part 24 on the side near the vehicle width center position in the vehicle width direction and the edge 30t of the rear liner 30 on the side far from the vehicle width center position in the vehicle width direction are provided as an integral line, and visibility to a user becomes relatively high.

Moreover, when the edge 24n of the first protruding strip part 24 on the side near the vehicle width center position in the vehicle width direction and the edge 30t of the rear liner 30 on the side far from the vehicle width center position in the vehicle width direction extend in parallel, the spacing between the edge 24n of the first protruding strip part 24 on the side near the vehicle width center position in the vehicle width direction and the edge 30t of the rear liner 30 on the side far from the vehicle width center position in the vehicle width direction becomes uniform in the upward-downward direction. For this reason, in a case where the rear liner 30 is visually recognized by a user, an impression that the rear liner 30 is assembled at a correct position with respect to the rocker molding 20 can be given to the user.

Meanwhile, in the shape of the rocker molding 20 adopted in the present embodiment, the first protruding strip part 24 is located on the side farther from the vehicle width center position in the vehicle width direction with respect to the rear liner 30 than a position indicated by the two-dot chain line in FIG. 3. Also, the spacing in the vehicle width direction between the edge 24n of the first protruding strip part 24 of the rocker molding 20 on the side near the vehicle width center position in the vehicle width direction and the edge 30t of the rear liner 30 on the side far from the vehicle width center position in the vehicle width direction is larger than the predetermined size. For this reason, the edge 24n of the first protruding strip part 24 on the side near the vehicle width center position in the vehicle width direction and the edge 30t of the rear liner 30 on the side far from the vehicle width center position in the vehicle width direction are provided as an integral line, and visibility to a user becomes relatively low.

Additionally, depending on the shape of the rocker molding 20, the first protruding strip part 24 may not become parallel to the edge 30t of the rear liner 30 on the side far from the vehicle width center position in the vehicle width direction. In a case where the first protruding strip part 24 does not extend parallel to the edge 30t of the rear liner 30 on the side far from the vehicle width center position in the vehicle width direction, the spacing between the edge 30t on the side far from the vehicle width center position in the vehicle width direction and the edge 24n of the first protruding strip part 24 on the side near the vehicle width center position in the vehicle width direction varies up and down. For this reason, in a case where the rear liner 30 is visually recognized, there is a possibility that a user may be caused to feel discomfort such as whether or not the rocker molding 20 is assembled at a correct position with respect to the rear liner 30.

In addition, in a case where the rocker molding 20 with a different shape is adopted in this way, for example, the following means may be taken in order to bring the edge 24n of the first protruding strip part 24 on the side near the vehicle width center position in the vehicle width direction and the edge 30t of the rear liner 30 on the side far from the vehicle width center position in the vehicle width direction into a positional relationship in which a user is not caused to feel the above discomfort.

That is, for example, when the first protruding strip part 24, and the edge 30t of the rear liner 30 on the side far from the vehicle width center position in the vehicle width direction are made to extend in parallel by changing the shape of the rear liner 30 in conformity with a change in the shape of the rocker molding 20 to change the position of the edge 30t of the rear liner 30 on the side far from the vehicle width center position in the vehicle width direction, the positional relationship can be maintained. However, depending on such means, a change in the shape of the rear liner 30 is needed in conformity with a change in the shape of the rocker molding 20. Thus, a large number of molding tools for the rear liner 30 used for manufacturing should be prepared, and an increase in costs related to manufacturing is caused.

Meanwhile, even when such a change in the shape of the rear liner 30 is not performed, when the first protruding strip part 24, and the edge 30t of the rear liner 30 on the side far from the vehicle width center position in the vehicle width direction are made to extend in parallel by changing the position of the edge 24n of the first protruding strip part 24 on the side near the vehicle width center position in the vehicle width direction, for example, in conformity with a change in the shape of the rocker molding 20, the positional relationship can be maintained. Specifically, in a case where the first protruding strip part 24 is located on the side far from the vehicle width center position in the vehicle width direction from a position where the first protruding strip part 24 has the positional relationship with respect to the rear liner 30, for example, in conformity with a change in the shape of the rocker molding 20, the width of the first protruding strip part 24 of the rocker molding 20 in the vehicle width direction is increased. Accordingly, the position of the edge 24n of the first protruding strip part 24 on the side near the vehicle width center position in the vehicle width direction can be changed to the side near the vehicle width center position in the vehicle width direction, and the positional relationship can be maintained between the edge 24n of the first protruding strip part 24 on the side near the vehicle width center position in the vehicle width direction and the edge 30t of the rear liner 30 on the side far from the vehicle width center position in the vehicle width direction. However, depending on such means, as long as the thickness of the first protruding strip part 24 in the vehicle width direction increases, sink marks are likely to be generated on a front surface of the first protruding strip part 24 when the rocker molding 20 is manufactured. In addition, the generation of such sink marks can be suppressed by applying pressure in a cooling step when the rocker molding 20 is manufactured. However, since the time related to manufacturing becomes longer as the time needed for the cooling step becomes longer, the productivity of the rocker molding 20 decreases.

In the above vehicle understructure, the second protruding strip part 25 is provided on the rocker molding 20 in addition to the first protruding strip part 24 that extends along the edge of the extending part 22 on the side far from the vehicle width center position in the vehicle width direction. Also, the second protruding strip part 25 is located closer to the edge 30t of the rear liner 30 on the side far from the vehicle width center position in the vehicle width direction than the first protruding strip part 24, and the edge 25n of the second protruding strip part 25 on the side near the vehicle width center position in the vehicle width direction extends parallel to the edge 30t of the rear liner 30 on the side far from the vehicle width center position in the vehicle width direction. Hence, even when the first protruding strip part 24 that extends along the edge of the extending part 22 on the side far from the vehicle width center position in the vehicle width direction is not parallel to the edge 30t of the rear liner 30 on the side far from the vehicle width center position, the spacing between the edge 25n, on the side near the vehicle width center position in the vehicle width direction, of the second protruding strip part 25 located closer to the rear liner 30, and the edge 30t of the rear liner 30 on the side far from the vehicle width center position becomes uniform in the upward-downward direction, and a situation in which a user feels discomfort can be suppressed. Moreover, the spacing in the vehicle width direction between the edge 25n of the second protruding strip part 25 on the side near the vehicle width center position in the vehicle width direction and the edge 30t of the rear liner 30 on the side far from the vehicle width center position in the vehicle width direction is set to the above predetermined size. Such a configuration can suppress a situation in which a user feels discomfort.

Additionally, a portion of the second protruding strip part 25 on the side farther from the vehicle width center position in the vehicle width direction than the protruding tip 25a of the second protruding strip part 25 is an inclined part 26 that is inclined such that the protruding height thereof becomes gradually lower toward the side far from the vehicle width center position. Also, the edge 25t of the second protruding strip part 25 on the side far from the vehicle width center position in the vehicle width direction has the same height as the outer surface 22a of the extending part 22, and is connected to the outer surface 22a. Accordingly, a line extending in the vehicle upward-downward direction is not visually recognized on the side of the second protruding strip part 25 farther from the vehicle width center position in the vehicle width direction than the protruding tip 25a. For that reason, when the second protruding strip part 25 is visually recognized, the edge 25n, on the side near the vehicle width center position in the vehicle width direction, of the second protruding strip part 25 extending parallel to the edge 30t of the rear liner 30 on the side far from the vehicle width center position in the vehicle width direction has relatively high visibility.

Additionally, in the above vehicle understructure, the protruding tip 25a having relatively high visibility is also parallel to the edge 30t of the rear liner 30 on the side far from the vehicle width center position in the vehicle width direction in addition to the edge 25n of the second protruding strip part 25 on the side near the vehicle width center position in the vehicle width direction. Thus, a sense of unity can be created.

In addition, as the protruding tip 25a of the second protruding strip part 25 and the edge 25n of the second protruding strip part 25 on the side near the vehicle width center position in the vehicle width direction, which extend parallel to the edge 30t of the rear liner 30 on the side far from the vehicle width center position in the vehicle width direction, are closer to each other, the edge 25n of the second protruding strip part 25 on the side near the vehicle width center position in the vehicle width direction and the protruding tip 25a of the second protruding strip part 25 are made to visually recognize as an integral line, and a sense of unity can be created.

In the vehicle understructure, the length L1 in the vehicle width direction from the protruding tip 25a of the second protruding strip part 25 to the edge 25n of the second protruding strip part 25 on the side near the vehicle width center position in the vehicle width direction is shorter than the length L2 from the protruding tip 25a of the second protruding strip part 25 to the edge 25t of the second protruding strip part 25 on the side far from the vehicle width center position in the vehicle width direction. For that reason, compared to a case where the above lengths are equal to each other or a case where the length L1 is made larger than the length L2, the protruding tip 25a of the second protruding strip part 25 and the edge 25n of the second protruding strip part 25 on the side near the vehicle width center position in the vehicle width direction can be brought closer to each other, and a sense of unity can be created.

When the configuration of the second protruding strip part 25 in a rocker molding 20 is adopted, the above-described respective effects are obtained even when the shape of the rear liner 30 is not changed. For that reason, there is no need for changing the shape of the rear liner 30 as the shape of the rocker molding 20 is changed, and a situation in which the number of molding tools for manufacturing the rear liner 30 increases is unlikely to occur.

Additionally, in the extending part 22 of the rocker molding 20, the protruding height of the second protruding strip part 25 is smaller than the protruding height of the first protruding strip part 24. In addition, no protruding strip is provided between the first protruding strip part 24 and the second protruding strip part 25, and a portion constituted of solely the thickness of the extending part 22 in the forward-rearward direction of the vehicle is present. For that reason, generation of sink marks in the vicinity of the first protruding strip part 24 in the rocker molding 20 can be suppressed, and even when sink marks are generated, the sink marks are unlikely to be generated on the outer surface side of the side wall part 21 of the rocker molding 20.

The embodiment may be changed to other following embodiments.

The thickness of the extending part 22 is not limited to a form in which the thickness becomes gradually smaller toward the side far from the vehicle width center position in the vehicle width direction from the side near the vehicle width center position in the vehicle width direction. For example, the thickness of the portion of the extending part 22 excluding the first protruding strip part 24 and the second protruding strip part 25 in the vehicle width direction may be constant.

The fixing pieces 22n of the extending part 22 of the rocker molding 20 on the side near the vehicle width center position in the vehicle width direction are not limited to a form in which two fixing pieces are provided side by side in the vehicle upward-downward direction. For example, a fixing piece having an integral shape from an upper part of the vehicle to a lower part thereof may be provided. Even in such a form, the fixing pieces 22n of the outer surface 22a of the extending part 22 are covered with the rear liner 30.

The length L1 in the vehicle width direction from the protruding tip 25a of the second protruding strip part 25 to the edge 25n of the second protruding strip part 25 on the side near the vehicle width center position in the vehicle width direction may be longer than the length L2 from the protruding tip 25a of the second protruding strip part 25 to the edge 25t of the second protruding strip part 25 on the side far from the vehicle width center position in the vehicle width direction. Additionally, the length L1 in the vehicle width direction from the protruding tip 25a of the second protruding strip part 25 to the edge 25n of the second protruding strip part 25 on the side near the vehicle width center position in the vehicle width direction may be equal to the length L2 from the protruding tip 25a of the second protruding strip part 25 to the edge 25t of the second protruding strip part 25 on the side far from the vehicle width center position in the vehicle width direction. Even in such a form, for example, when the width of the second protruding strip part 25 in the vehicle width direction is smaller than the width of the second protruding strip part 25 of the embodiment and the protruding tip 25a of the second protruding strip part 25 and the edge 25n of the second protruding strip part 25 on the side near the vehicle width center position in the vehicle width direction are sufficiently close to each other, a sense of unity can be created.

The protruding tip 25a of the second protruding strip part 25 and the edge 30t of the rear liner 30 on the side far from the vehicle width center position in the vehicle width direction may not be parallel to each other. In such a form, when the edge 25n of the second protruding strip part 25 on the side near the vehicle width center position in the vehicle width direction and the edge 30t of the rear liner 30 on the side far from the vehicle width center position in the vehicle width direction extend in parallel, a situation in which a user feels discomfort can be suppressed.

In the inclined part 26 of the second protruding strip part 25, a portion that connects the portion 26a on the vehicle width center side in the vehicle width direction and the portion 26b on the side far from the vehicle width center position in the vehicle width direction together may not be a smoothly curved surface, and may have a shape with an edge. In such a form, in addition to the edge 25n of the second protruding strip part 25 on the side near the vehicle width center position in the vehicle width direction, a portion that connects the portion 26a on the vehicle width center side in the vehicle width direction on the side farther from the vehicle width center position in the vehicle width direction than the protruding tip 25a and the portion 26b on the side far from the vehicle width center position in the vehicle width direction together is provided as a boundary line that extends in the vehicle upward-downward direction and has relatively high visibility. However, when at least the edge 30t of the rear liner 30 on the side far from the vehicle width center position in the vehicle width direction and the edge 25n of the second protruding strip part 25 on the side near the vehicle width center position in the vehicle width direction extend in parallel, a situation in which a user feels discomfort can be suppressed. Additionally, since a boundary line between the portion 26a and the portion 26b is relatively close to the first protruding strip part 24, the boundary line is concealed by the first protruding strip part 24, and has relatively low visibility. For that reason, a possibility that discomfort may be caused due to the presence of the boundary line between the portion 26a and the portion 26b is not high.

The inclined part 26 of the second protruding strip part 25 may not change in inclination angle midway in the vehicle width direction and may be inclined at the same inclination angle from the protruding tip 25a of the second protruding strip part 25 to the edge 25t of the second protruding strip part 25 on the side far from the vehicle width center position in the vehicle width direction.

The protruding tip 25a of the second protruding strip part 25 may not have a shape with an edge. For example, a portion from the edge 25n of the second protruding strip part 25 on the side near the vehicle width center position in the vehicle width direction to the protruding tip 25a and a portion on the side far from the vehicle width center position in the vehicle width direction from the protruding tip 25a may be connected together by a smoothly curved surface.

The rocker molding 20 may include a plate-shaped extending part that extends toward the vehicle width center position in the vehicle width direction from a front end of the side wall part 21. Also, in the extending part of the above form, a front liner may be attached to the extending part so as to cover a portion on the vehicle width center side in the vehicle width direction in an outer surface (front surface) in the forward-rearward direction of the vehicle. When the same configuration as the rocker molding 20 and the rear liner 30 of the above embodiment is adopted even in the rocker molding and the front liner in the above form, the same effects as those of the embodiment can be obtained. Additionally, components, such as the second protruding strip part 25, may not be applied to the rear end of the rocker molding 20 to which the rear liner 30 is attached, and components, such as the second protruding strip part 25, may be applied to the front end of the rocker molding 20 to which the front liner is attached. That is, components, such as the second protruding strip part 25 of the embodiment, may be applied to at least an end part of the rocker molding 20 in the forward-rearward direction of the vehicle.

What is claimed is:

1. A vehicle understructure comprising:
   a rocker molding that is disposed at a lower part of a vehicle, the rocker molding extending in a forward-rearward direction of the vehicle; and
   a liner that is attached to at least one end part of the rocker molding in the forward-rearward direction of the vehicle, wherein:
   the rocker molding includes a side wall part and an extending part which is plate-shaped;
   the side wall part extends in the forward-rearward direction of the vehicle in a range from a wheel housing on a front side of the vehicle to a wheel housing on a rear side of the vehicle;
   the extending part extends toward a vehicle width center position in a vehicle width direction of the vehicle from one end part of the side wall part in the forward-rearward direction of the vehicle, which is the one end part of the rocker molding;
   the liner is attached to the extending part so as to cover a portion of an outer surface of the extending part on a vehicle width center side in the vehicle width direction;
   the outer surface is a surface far from a forward-rearward center position of the vehicle out of two surfaces of the extending part in the forward-rearward direction of the vehicle;
   the outer surface of the extending part includes a first protruding strip part and a second protruding strip part that protrude toward a side far from the forward-rearward center position of the vehicle;
   the first protruding strip part extends along an edge of the extending part on the side far from the vehicle width center position in the vehicle width direction;
   the second protruding strip part is located between on an edge of the liner on the side far from the vehicle width center position in the vehicle width direction and the first protruding strip part; and
   the edge of the liner on the side far from the vehicle width center position in the vehicle width direction and an edge of the second protruding strip part of the extending part on a side near the vehicle width center position in the vehicle width direction extends in parallel.

2. The vehicle understructure according to claim 1, wherein a portion of the second protruding strip part on a side farther from the vehicle width center position in the vehicle width direction than a protruding tip of the second protruding strip part is inclined such that a protruding height of the second protruding strip part becomes gradually lower toward the side far from the vehicle width center position.

3. The vehicle understructure according to claim 2, wherein the protruding tip of the second protruding strip part extends parallel to the edge of the liner on the side far from the vehicle width center position in the vehicle width direction.

4. The vehicle understructure according to claim 3, wherein a length in the vehicle width direction from the protruding tip of the second protruding strip part to the edge of the second protruding strip part on the side near the vehicle width center position in the vehicle width direction is shorter than a length from the protruding tip of the second protruding strip part to the edge of the second protruding strip part on the side far from the vehicle width center position in the vehicle width direction.

* * * * *